(12) United States Patent
Fu

(10) Patent No.: US 6,476,871 B1
(45) Date of Patent: Nov. 5, 2002

(54) TEXT DISPLAY ON REMOTE DEVICE

(75) Inventor: Mark Fu, Irvine, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/382,522

(22) Filed: Aug. 25, 1999

(51) Int. Cl.[7] ................................. H04N 7/08
(52) U.S. Cl. .................. 348/465; 348/564; 348/468; 348/512
(58) Field of Search ................. 348/564, 553, 348/512, 468, 465; 704/270

(56) References Cited

U.S. PATENT DOCUMENTS

| | | |
|---|---|---|
| 5,161,251 A | 11/1992 | Mankovitz |
| 5,282,028 A | 1/1994 | Johnson et al. |
| 5,561,849 A | 10/1996 | Mankovitz |
| 6,061,056 A * | 5/2000 | Menard ............... 345/327 |
| 6,243,676 B1 * | 6/2001 | Witteman ............ 704/243 |

* cited by examiner

*Primary Examiner*—Victor R. Kostak
(74) *Attorney, Agent, or Firm*—Marger Johnson & McCollom, P.C.

(57) ABSTRACT

A method for displaying closed-captioning with audio programs. The audio signal data is located and sent to an audio signal processor for conversion into an audio program. The closed-captioning data is located and decoded to produce a textual display synchronized with the audio program. The closed-captioning data is displayed on a remote device, either as part of a consumer electronics system, or as a stand alone network device. The invention also includes one example of an apparatus that receives and decodes the components of a complex audio signal to produce both the audio program and the closed-captioning on the remote device.

9 Claims, 1 Drawing Sheet

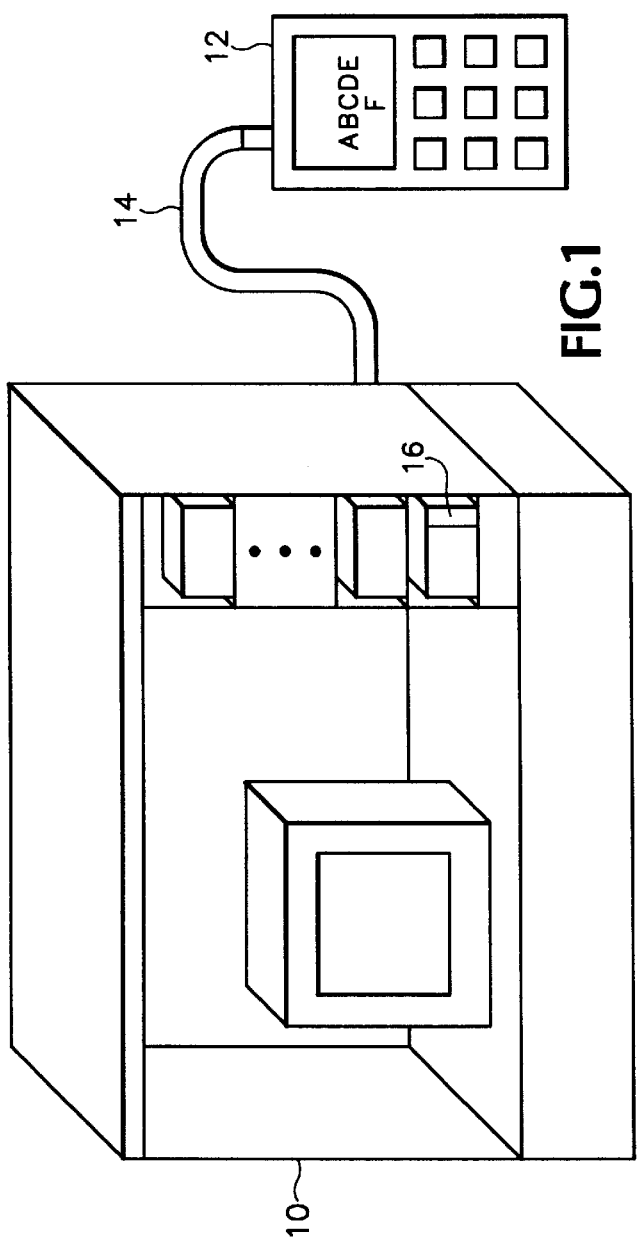
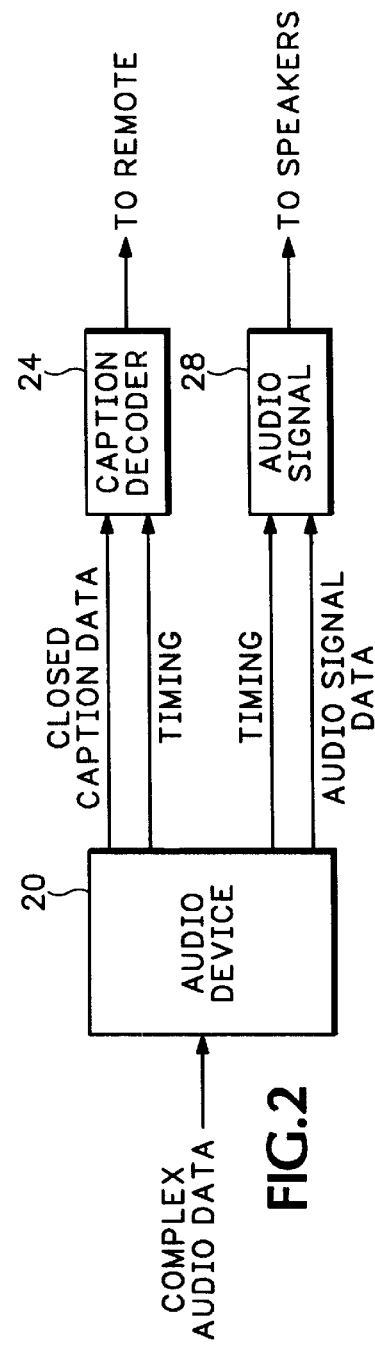
FIG.1
FIG.2

TEXT DISPLAY ON REMOTE DEVICE

BACKGROUND OF THE INVENTION

1. Field of the Invention

This invention relates to display of textual information on a remote device, more particularly to text information accompanying audio programs.

2. Background of the Invention

Hand-held remote control devices are very common, as they accompany just about every type of consumer electronics device sold today. These include televisions, VCRs, DVD players, set-top boxes, CD players, tuners, and tape decks. Indeed, the proliferation of remote control devices has resulted in the development of programmable remotes that can absorb the functions of most of these remotes and consolidate them into one place.

Another advance in remote controls is the remote control with a separate display for controlling these various devices. One example of such a remote control is shown in U.S. Pat. No. 5,282,028. The remote control device described in this patent has an alphanumeric display, typically an LCD panel, on the remote control device. This device allows the user to not only control the various devices with a control communication means; it also allows the user to receive information visually from the various devices.

One example in the patent is the ability to receive information with regard to music being played across the television audio system. For example, some cable and satellite providers have "cable-CD" channels that broadcast music of a certain type across a particular channel of the television. The information sent to the remote control includes the name of the selection, the artist, the time, etc., information very similar to that which would be provided by a disc jockey in a broadcast environment. However, the information provided on the remote control is the information provided at the television, it is reproduced on the remote control device.

The display of textual information with regard to music broadcasts is the topic of two other patents. In U.S. Pat. No. 5,161,251, a method and apparatus is disclosed that allows the textual information related to a broadcast piece of music to be displayed on a display with the musical selection. Again the information is that related to the specifics of a piece of music, such as title, artist, year, etc. This information is broadcast as an auxiliary signal on the main carrier signal from the broadcast station. A further adaptation of this patent is shown in U.S. Pat. No. 5,561,849, in which the lyrics of the musical selection are broadcast at the same time. The broadcast could be from a broadcast center, such as an FM transmitter. The lyrics are combined with the audio broadcast and sent as auxiliary data on the main carrier signal. A tuner that displays both the tuning information on one display and the lyrics on another display receives the lyrics. Methods are provided for coordination between the lyrics and the music.

However, these approaches do not provide for any means of receiving the lyrics or textual information from other sources than the broadcast message. Additionally, the display of the lyrics is limited to the tuning device that receives the signal.

SUMMARY OF THE INVENTION

One aspect of this invention is a method of displaying text corresponding to closed-captioning for audio programs. Audio signal data and closed-captioning data are located for an audio program. The audio signal data is then converted to sound to produce the audio program and the closed-captioning data is simultaneously displayed on a remote device. The remote device may be a remote device associated with a consumer electronics system, or a stand alone remote connected to a network.

Another aspect of the invention is an apparatus for receiving a complex audio signal having both audio signal data and closed-captioning data. The audio signal data is sent to an audio signal processor. The closed-captioning data is sent to a closed-caption decoder that decodes the data and converts it into a textual display. The display of the text and the playing of the audio signal are synchronized.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows one example of a consumer electronics device and a remote displaying closed-captioned lyrics.

FIG. 2 shows one example of a decoder for decoding closed-caption lyrics from an audio signal.

DETAILED DESCRIPTION OF THE PREFERRED EMBODIMENTS

FIG. 1 shows one example of a system that can utilize aspects of the invention. A consumer electronics system comprised of several components, which may include a television, a CD player, a tape deck, a VCR, a receiver, a DVD player, among other components. For purposes of this discussion, one component will be referred to as an audio device.

This device could be one of any of the above devices, as well as other types of devices. Its characteristics must include the ability to receive complex audio data. Complex audio data has as one component audio signal data, which can be converted into audible sounds, such as the bit stream from a CD that is sent through a CD player to produce music. At a minimum, the complex audio data contains an encoded closed-caption file of the audio signal data, operable to produce any text that is part of the audio signal data, such as lyrics, as a textual display.

The format of the closed-captioning data could be one of many types. For example, the format could be SAMI™ (Synchronized Accessible Media Interchange) from Microsoft Corporation. Any other type of audio synchronized text file format may be used as well. It will require some sort of synchronization between the musical play sequence and the text, such as a time stamp that indicates when a given portion of text is to be displayed. The time stamp will more than likely be relative to the time of musical play.

Referring again to FIG. 1, it can be seen that the consumer electronics system 10 has connection with a remote device 12. The connection between the system 10 and the device 12 could be via a cable 14. However, the connection could be via several other types, such as an infrared link or IrBUS™ technology. For example, the port 16 for the remote device could be part of one of the components of the system. The component having the port is not limited to the audio player although that may be the most sensible approach.

Further, the remote device 12 does not necessarily connote a remote control device, in that the device may not actually have control functions for operating the consumer electronics system 10. The remote device could be a peripheral part of the consumer electronics device that is specifically provided for such textual displays. However, for familiarity reasons, the remote device of FIG. 1 is shown as a remote control device with a screen for displaying the captioned text.

One possibility for the consumer electronics system could be an Internet, or other networked, server located outside the home, of which the remote device is the only part of the system actually seen by the consumer. The server could download music via the Internet or other network and play both the audio signal and the closed-captioning display at the remote device. In this case, all parts of the apparatus necessary to perform this invention would be contained in the remote device The discussion has focused on the overall system and its operation, whether it is a part of an in-home consumer electronics device, or a remote server. Referring now to FIG. 2, it is possible to see one implementation of an apparatus to decode the audio signal data for synchronization with the closed-captioning data.

In this implementation, the complex audio data is received as one stream at the audio player 20. However, the two components could be received as two separate streams. In this example, the audio play has a decoder that splits the complex stream into its individual components and send the audio signal data to the audio signal converter 28 that converts the audio signal into sounds heard by the consumer. The closed-captioning data is sent to a caption decoder 24 that converts the data into textual display. The timing signals may be sent only to the caption decoder, only to the audio signal converter, or to both.

Once the synchronization, conversion and decoding are complete, the two signals are sent to the appropriate portion of the consumer electronics device. In this case, the audio signal data converted into sound signals is sent to the speakers as an audio program. The closed-captioning text is sent to the remote device for display.

One specific example would be if the lyrics or textual part of the complex audio signal were encoded using the SAMI format. The complex audio signal would constitute the SAMI file and the audio data. The audio device of FIG. 2 could be part of a CD player. In this instance, the CD player would comprise the audio player 20, the caption decoder 24 and the audio signal processor 28. In this case the timing information would be the time stamp within the SAMI file. The caption data would need to be decoded and sent to the remote device as the audio device tracks the playing time of the audio signal. In this case, the timing signal does not need to be sent to the audio signal processor, one of the options for the timing information mentioned above.

This invention allows the hearing impaired to see the lyrics to accompany the music to which others are listening. Alternately, it could allow them to read a pre-recorded speech that was encoded with the synchronized closed-captioning. In either instance, or in any of a number of examples, this invention allows a person to read the textual content of an audio program.

It should be noted here that although a television is shown as part of a consumer electronics system, the television is not needed for implementation of this invention. Typically, however, the television is the device that requires a remote control device. The remote control device of a television is only one example of a remote device to be used for displaying the closed-captioning discussed above.

Thus, although there has been described to this point a particular embodiment for a method and structure for closed-captioning data for an audio program to be displayed on a remote device, it is not intended that such specific references be considered as limitations upon the scope of this invention except in-so-far as set forth in the following claims.

What is claimed is:

1. A method for displaying closed-captioning data for an audio signal on a remote device, comprising the steps of;

locating and decoding audio signal data;

locating and decoding closed-captioning data, wherein the closed-captioning data and the audio signal data come from separate sources;

playing the audio signal data, thereby producing an audio program;

coordinating timing of the closed-caption data to synchronize the closed-captioning data with the audio program; and displaying the closed-captioning data on the remote device.

2. The method as claimed in claim 1 wherein said audio signal data is located on a compact disc.

3. The method as claimed in claim 1 wherein said audio signal data is located on a networked server.

4. The method as claimed in claim 1 wherein said closed-captioning data is located on a networked server.

5. The method as claimed in claim 1 wherein said remote device further comprises a remote control for a consumer electronics system.

6. The method as claimed in claim 1 wherein said remote device further comprises a remote network device.

7. An apparatus for displaying closed-captioning data for an audio signal on a remote device, comprising:

an audio device operable receive to an audio signal and a closed-captioning component, wherein the closed-captioning component and the audio signal come from separate sources;

a closed-captioning decoder, operable to convert the closed-captioning component into a textual display;

an audio signal processor operable to produce an audio program from the audio signal, and to synchronize the closed-captioning component to the audio signal; and a remote device to display the textual display.

8. The apparatus as claimed in claim 7 wherein said audio device, said closed-captioning decoder and said audio signal processor are all contained in a single piece of equipment.

9. The apparatus as claimed in claim 7 wherein said remote device contains said audio device, said closed-captioning decoder and said audio signal processor.

\* \* \* \* \*